United States Patent [19]
Botte

[11] Patent Number: 5,958,160
[45] Date of Patent: Sep. 28, 1999

[54] VALVE WITH ELLIPTICAL BASE

[75] Inventor: Patrick Botte, Cebazat, France

[73] Assignee: Compagnie Generale des Etablissements Michelin - Michelin & Cie, Clermont-Ferrand Cedex, France

[21] Appl. No.: 08/800,994

[22] Filed: Feb. 20, 1997

[30] Foreign Application Priority Data

Feb. 22, 1996 [FR] France ................................. 96 02314

[51] Int. Cl.[6] .............................. B60C 29/02; F16J 15/10
[52] U.S. Cl. ........................... 152/427; 137/223; 277/639
[58] Field of Search ................... 152/427, 429; 277/639; 137/223

[56] References Cited

U.S. PATENT DOCUMENTS

| | | | |
|---|---|---|---|
| 2,158,576 | 5/1939 | Glassley | 152/415 |
| 2,731,065 | 1/1956 | Powers | 152/427 |
| 2,744,559 | 5/1956 | Leonetti | 152/427 |
| 2,835,305 | 5/1958 | Boyer | 152/427 |
| 2,837,134 | 6/1958 | Steer | 152/427 |
| 2,928,447 | 3/1960 | Hosking | 152/427 |
| 2,949,325 | 8/1960 | Nenzell | 277/180 |
| 3,042,248 | 7/1962 | Krueger | 277/180 X |
| 3,231,288 | 1/1966 | Hensien | 277/180 X |
| 3,259,404 | 7/1966 | Papenguth | 277/180 X |
| 3,285,615 | 11/1966 | Trbovich | 277/180 |

FOREIGN PATENT DOCUMENTS

| | | |
|---|---|---|
| 1137853 | 6/1957 | France . |
| 725775 | 3/1955 | United Kingdom . |

*Primary Examiner*—Francis J. Lorin
*Attorney, Agent, or Firm*—Baker & Botts, L.L.P.

[57] ABSTRACT

A valve for removable attachment to the rim of a heavy-vehicle tubeless tire includes a valve base, a locking nut and a sealing joint. The valve base has a tubulure that passes through an opening in the rim, a shoulder for compressing the sealing joint against one surface of the rim and two diametrically opposite resting surfaces for engaging the rim surface and limiting the compression of the sealing joint. The locking nut cooperates with the opposite surface of the rim to compress the sealing joint against the rim.

9 Claims, 5 Drawing Sheets

VALVE WITH ELLIPTICAL BASE

BACKGROUND OF THE INVENTION

The object of the present invention is a valve of reduced size intended to be fastened tightly in the rim of a wheel in order to assure the supply of air to a tubeless tire mounted on said rim, and more particularly a valve intended for heavy-vehicle tire rims of sheet steel.

The sheet-steel wheel rims of heavy vehicle tires, such as the rim shown in FIG. 1, conventionally have their region of assembly between the rim and the wheel disk located between the bead seat on the wheel-disk side and the wall of the mounting well. Preferably, this connecting zone is located in the immediate vicinity of the end of the bead seat. The valve hole is disposed in the outer wall of the mounting well of the rim. The valve stem is introduced into the valve hole from the radially outer side of the rim (corresponding to the inside of the tire after the mounting of the latter) and is locked by a nut screwed on from the inner side of the rim. The valve base is adjacent an annular recess which accommodates a sealing joint. Upon the locking, the nut is tightened to a given torque. The bent valve stem extends through an opening in the disk of the wheel. In this way, the valve stem represents a protuberance in the space located between the rim and the axle, in which space the hub and the brake members are housed.

On occasion, an untimely deflation of the tires occurs due to breakage of the valve. With axles provided with disk brakes, there is the possibility of passage between the bottom of the rim and the brake disk of foreign bodies which are carried along in rotation into these cavities and can become wedged, in particular, between the valve stem, which turns with the wheel, and the brake caliper which is stationary. The passage of foreign bodies into these cavities is facilitated by the free space between the rim and the brake disk. One then observes mechanical impacts caused by these foreign bodies wedged between movable and stationary parts. These impacts may be sufficiently severe to break metal parts, such as the valve stems or damage the rim or the parts constituting the brake caliper, and the braking system in general. This leads to critical situations, whether by failure of braking or by a sudden flattening, in addition to maintenance problems.

One solution consists in arranging the valve hole in such a manner that the valve stem is placed outside the cavity defined by the rim, the wheel disk, and the brake members. In other words, the valve hole extends to a zone located axially to the outside of the wheel disk. Such arrangements for the valve hole are conventional for wheels of passenger cars or for certain alloy cast wheels for utility vehicles, but have not yet been applied to the plate wheels of utility vehicles.

In fact, it has been observed that the application of the above solution to plate wheels for utility vehicles can result in a considerable decrease in the resistance to fatigue of the resultant wheels.

In order to obtain wheels of acceptable fatigue strength, the applicant has discovered that it was necessary to locate the region of assembly between the disk and the rim as close as possible to the end of the bead seat on the disk side. This solution considerably reduces the space available for the valve stem on the radially inner side of the rim and, in particular, the valves conventionally used can no longer be used since the valve stem cannot be bent at an angle sufficient to be able to be mounted on the rim while permitting the screwing-on of the nut.

A valve in which the stem is directed perpendicular to the axis of the valve hole is disclosed in U.S. Pat. No. 2,864,426. That valve is mounted in reverse manner. The valve base has a tubulure introduced through the valve hole from the radially inner side of the rim and locked by a nut screwed on from the outer side of the rim. The valve base has an annular recess intended to house a sealing joint and, in the case of a "toroidal sealing ring" (FIG. 1), a resting surface against the surface of the rim is also annular. In the case of a "grommet" (FIG. 3), the valve base does not have an annular resting surface but a simple protective collar for the joint. The valve base comprises a connecting chamber between the preceding tubulure and a perpendicularly arranged stem.

This solution has various drawbacks. The first relates to the fact that the locking nut is located completely on the outside of the rim. As a result, the mechanical connecting surface is reduced, which results in problems of mechanical strength or, if this length is increased, this means an extensive protrusion to the inside of the tire cavity, which may injure the heel of the tire upon its mounting.

Another problem relates to the transverse size of the valve, which is still too great; this valve therefore cannot solve the problem in question.

SUMMARY OF THE INVENTION

The object of the invention is a valve which substantially overcomes the above problems.

The object of the invention is a valve intended to be attached removably to the rim of a heavy-vehicle tubeless tire by passing through a valve hole, in which the means for the tight fastening to the rim comprise:

a valve base with a tubulure intended to pass through said rim, having a shoulder perpendicular to the axis of said tubulure forming a first resting surface against a first surface of said rim, said shoulder having means for maintaining a sealing joint;

locking means forming a second resting surface against a second surface of said rim and cooperating with said tubulure in order to compress said sealing joint axially between said shoulder and said first surface of the rim, characterized by the fact that said first resting surface is formed of two diametrically opposite resting zones.

Contrary to the conventional valves with toroidal sealing ring, the resting zone of the base of the valve is not annular but is formed of two diametrically opposite zones, which makes it possible to reduce the diameter of the valve base in the direction of the stem of the valve. And it is actually this transverse direction which is critical. In the perpendicular circumferential direction, the resting zones can extend freely. Therefore, the shoulder of the valve base can advantageously assume a generally elliptical shape. The function of this resting surface, of permitting a locking of the valve base against the surface of the rim with constant torque with axially controlled crushing of the sealing joint is not modified.

The mounting of the valve in accordance with the invention can advantageously be similar to that of the valve disclosed in U.S. Pat. No. 2,864,426 but providing the tubulure of the valve base with an internal thread intended to cooperate with a locking screw introduced through the radially outer part of the rim. This solution has the advantage of assuring a zone of mechanical connection between the tubulure and the locking screw of an axial height greater than the thickness of the rim, which assures excellent mechanical strength for the assembly. Furthermore, the protrusion of the locking screw on the radially outer side of the rim is very slight.

DESCRIPTION OF PREFERRED EMBODIMENTS

Figure 1:
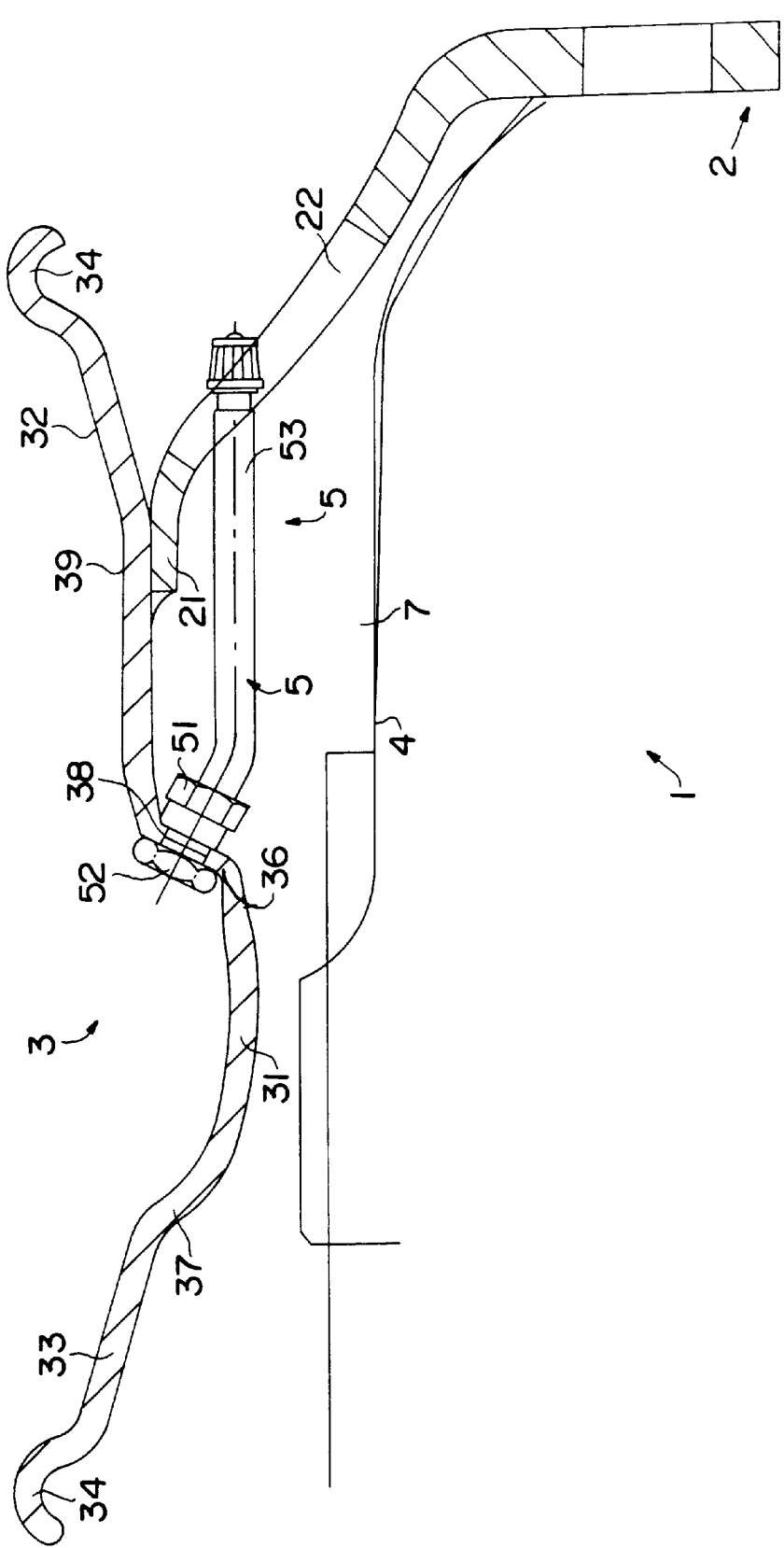
FIG. 1 is an axial section through a conventional wheel rim of a utility vehicle having a customary valve.

FIG. 1 shows a section through a conventional plate wheel 1 in accordance with the recommendations of the European Tire and Rim Technical Organization (ETRTO).

This utility-vehicle wheel 1, of a single piece of steel plate is formed of a disk 2, a rim 3 and a valve 5. The rim comprises a central mounting well 31, two bead seats, 32 on the disk side and 33 on the opposite side, and two flanges 34. The well 31 is connected to the seat 33 on the side opposite the disk 2 by a wall 37 and on the side of the disk 2 by a wall 36, followed by a connecting zone 39 between the rim 3 and the disk 2. This connection is effected by welding the end of the disk 2 on the radially inner wall of the connecting zone 39. The valve hole 38 is located in the well wall 36 on the side of the disk 2. Therefore, the valve stem 53 is located on the inside of the disk 2 of the wheel and passes through the disk 2 via the opening 22. The valve base 52 is mounted radially to the outside of the rim 3 and is fastened by the screwing-on of the nut 51, radially to the inside of the rim 3.

In this figure, there can also be noted the outer contour of the brake members 4 of the vehicle. It can be noted that the cavity 7 between the rim 3, the disk 2 and the brake members 4 is relatively small, which makes the valve 5 vulnerable to objects, such as stones, which penetrate inside the disk.

Figure 2:
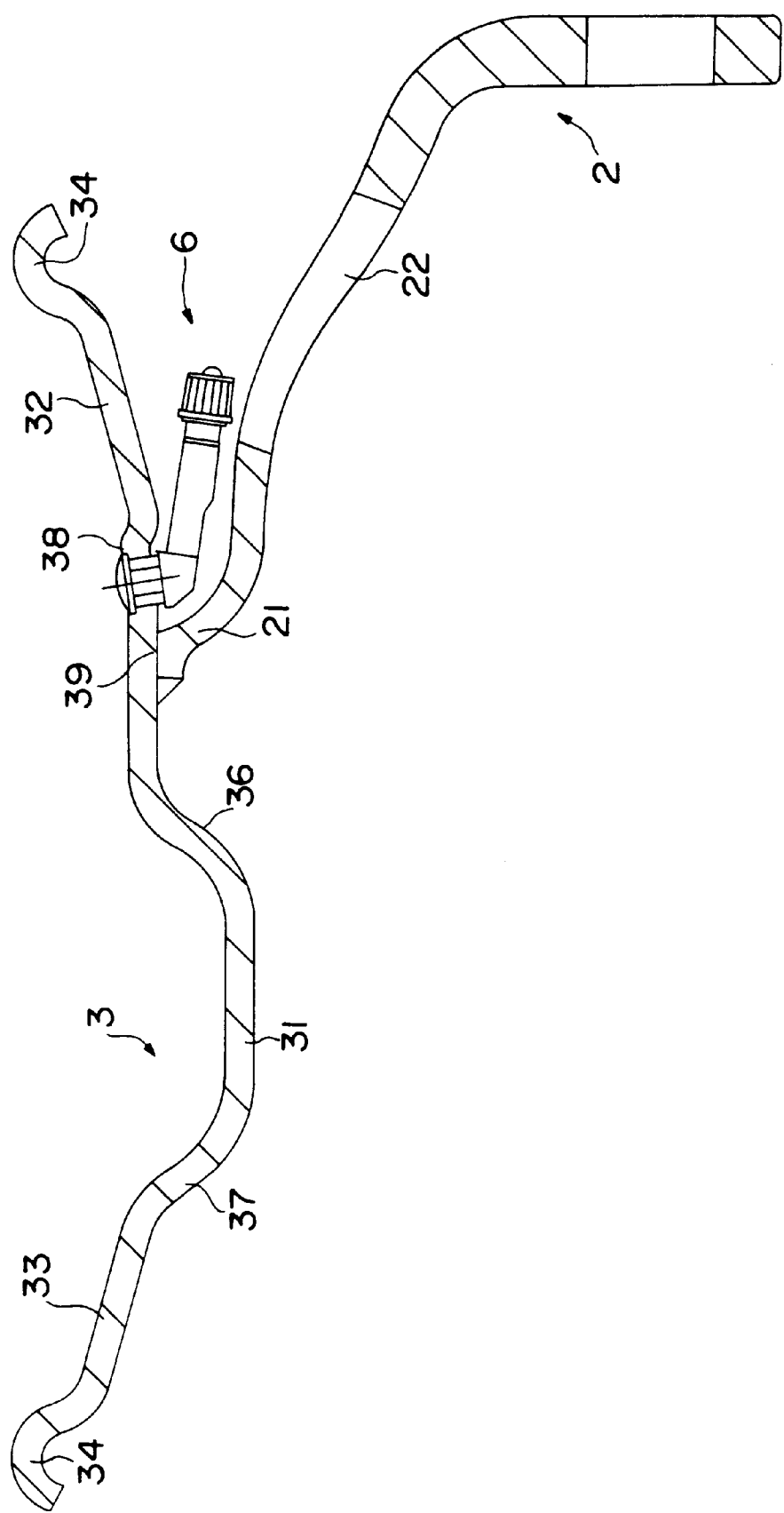
FIG. 2 is a similar section through a rim equipped with a valve in accordance with the invention which valve is outside of the wheel disk.

FIG. 2 is a section through the wheel with a valve hole 38 located between the disk-side seat 32 and the disk/rim connecting zone 39. The valve equipping this wheel cannot be damaged by objects which enter into the cavity 7. On the other hand, it is no longer possible to use for this wheel a valve identical to that of FIG. 1 since the valve stem 53 cannot be bent sufficiently to be adapted to the wheel disk while permitting passage of the nut 51.

Figure 3:
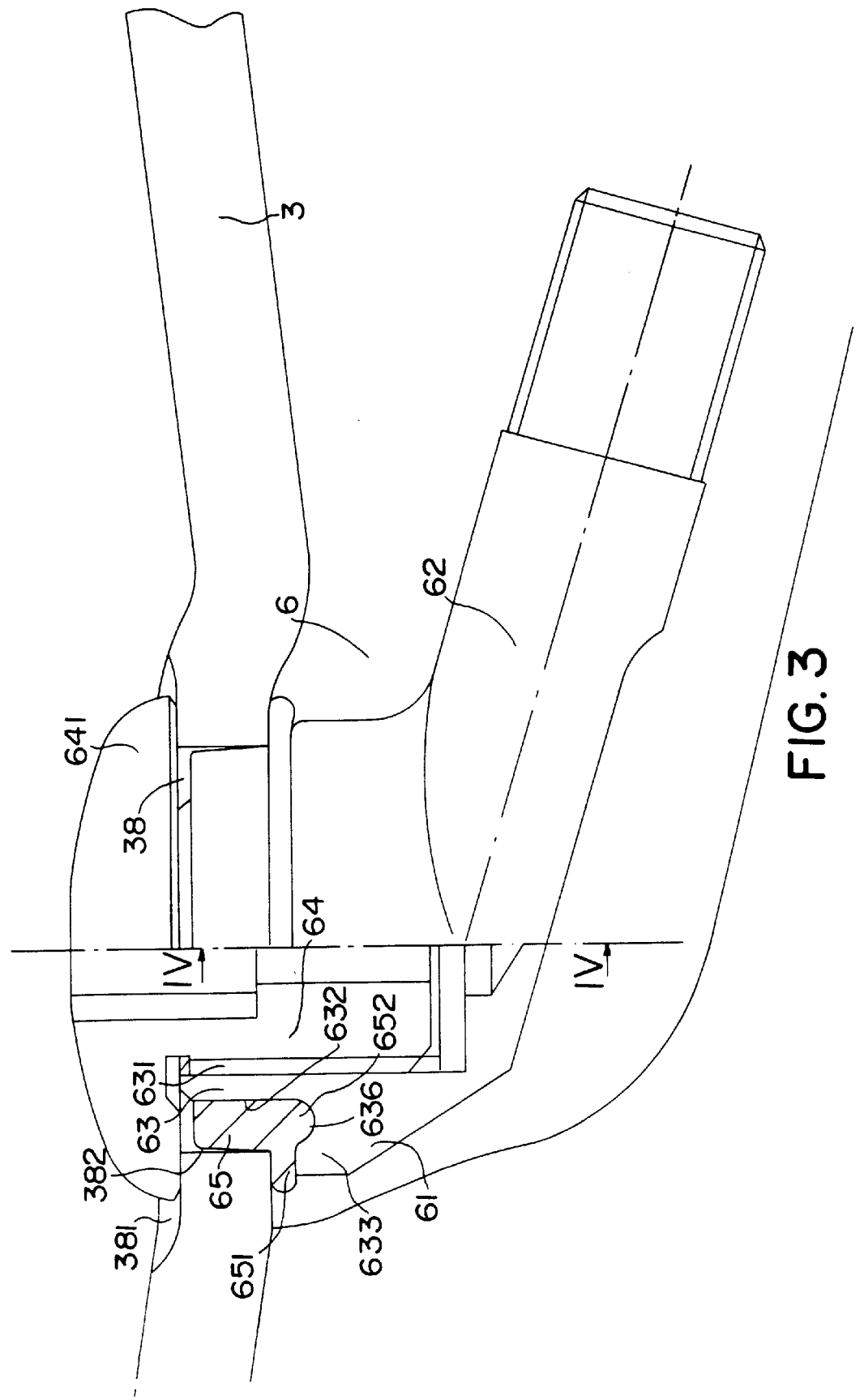
FIG. 3 is a detail of FIG. 2, showing the mounting of a valve in accordance with the invention.

FIG. 3 shows an enlargement of FIG. 2, illustrating the mounting on this wheel of a valve 6 in accordance with the invention. The valve base 61 of the valve 6 is mounted radially to the inside of the rim 3. A valve stem 62 extends from this valve base 61 to the outside of the disk 2 and is equipped in its end portion with the customary closure means (not shown) in order to permit the inflation/deflation of the tires.

The valve base 61 comprises a cylindrical tubulure 63 intended to pass through the valve hole 38 in the rim 3. This tubulure 63 has a thread 631 in its inner wall which cooperates with a screw 64 to assure the fastening of the valve 6 on the rim 3. The tubulure 63 thus serves as nut. The axial heights of the threads of the tubulure 63 and of the screw 64 are substantially greater than the thickness of the rim 3 in order to assure an excellent mechanical holding of the assembly. The head 641 of the screw 64 is preferably housed, at least in part, within a recess 381 provided around the valve hole 38 on the radially outer side of the rim 3. This makes it possible to reduce the protrusion of this screw head 641 to the outside of the surface of the rim, which protrusion could otherwise damage a heel of the tire upon the mounting thereof.

The outer wall 632 of the tubulure 63 is smooth and terminates on the side of the valve base 61 by a shoulder 633 against which the base 651 of a sealing joint 65 rests. This sealing joint 65 is arranged all around the outer wall 632 of the tubulure 63 in order to assure tightness between this wall 632 and the wall 382 of the valve hole 38. Its base 651 has an annular collar for resting against the shoulder 633 of the tubulure 63 and thus assures tightness between said shoulder 633 of the tubulure and the radially inner wall of the rim 3 around the valve hole 38.

Such a joint is usually referred to as a "grommet" and its base preferably comprises a collar 652 intended to fit in the annular recess 636 of the shoulder 633 of the tubulure 63. In the plane of this FIG. 3, there is no direct resting between the shoulder 633 of the tubulure 63 and the radially inner surface of the rim 3 around the valve hole 38.

Figure 4:
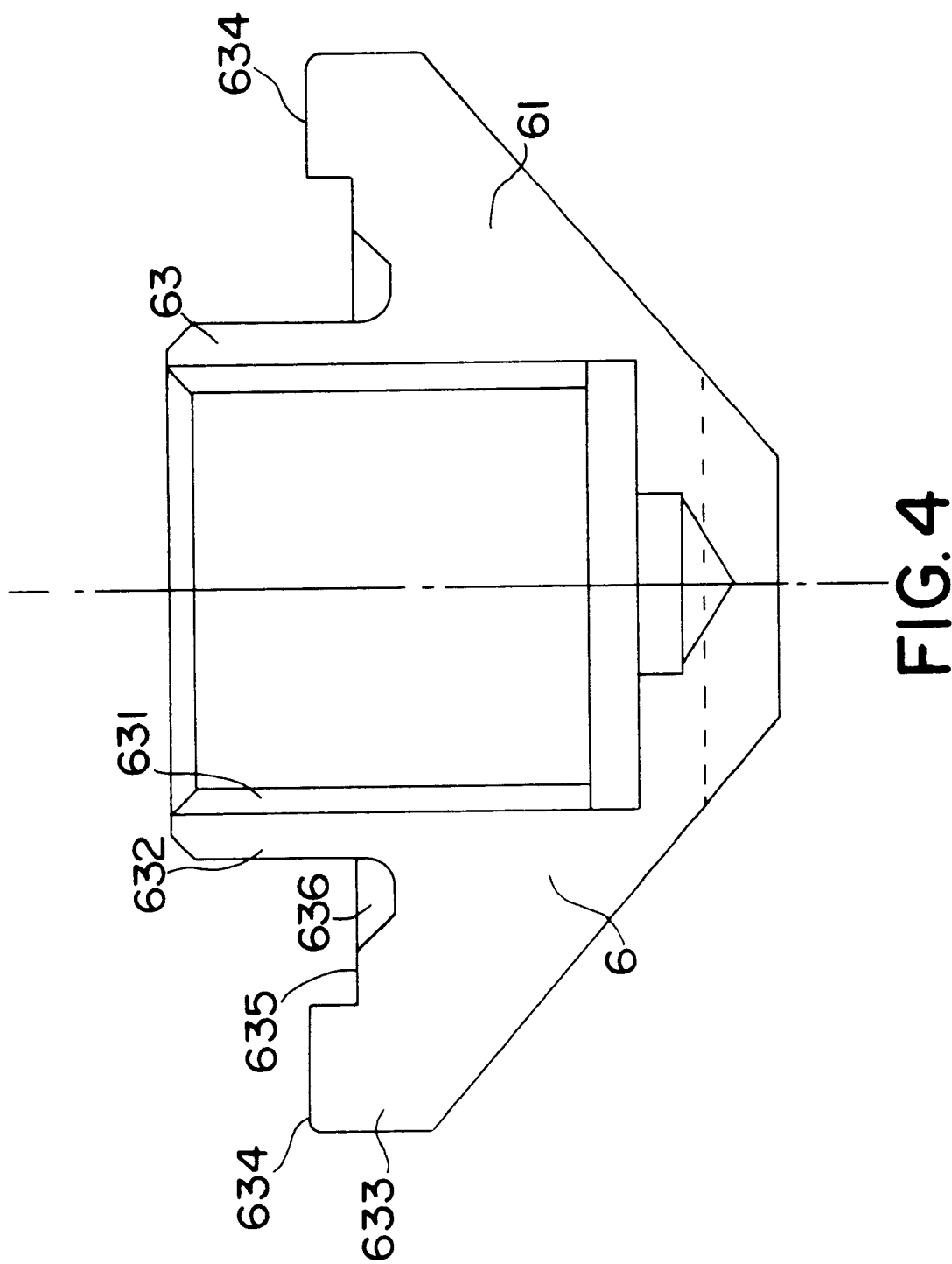
FIG. 4 is a section along the line IV—IV, as indicated in FIG. 3, of a valve in accordance with the invention.

FIG. 4 is a section along the line IV—IV such as indicated in FIG. 3 of the valve base 61. This section is therefore oriented circumferentially relative to the wheel when the valve 6 is mounted on a wheel. In this plane, and taking as reference the axis of the tubulure 63, the shoulder 633 of this tubulure 63 terminates radially in two regions 634 which are raised axially and the flat outer surface of which is intended to come directly against the surface of the rim 3, on both sides of the valve hole 38. The shoulder 633 therefore comprises an annular recess 635 intended to receive the base 651 of the sealing joint 65, followed by these two areas 634 for resting against the surface of the rim. The axial and radial dimensions of the recess 635 relative to the outer wall 632 of the tubulure 63 are such that the sealing joint 65 can be compressed sufficiently upon the clamping in order to assure good tightness without being damaged when the resting zones 634 abut on the radially inner face of the rim. The shoulder 633 preferably has, in general, an elliptical shape.

The presence of these resting zones 634 with this circumferential orientation has several decisive advantages: They assure a metal-to-metal locking upon the fastening of the valve 6 on the rim 3, which permits clamping with a specific, reproducible torque. This manner of clamping, which is customary in the case of toroidal sealing rings with a circumferential resting surface is by no means usual in the case of the ordinary valves equipped with grommet joints. In that case, the clamping is usually assured by rubber against metal, which requires greater attention, in particular upon subsequent retightenings if it is not desired to destroy the joint.

Furthermore, the circumferential orientation of the two resting zones relative to the joint 3 does not penalize the space taken up by the valve in the transverse direction. On the contrary, relative to a valve with conventional seal by means of a toroidal sealing ring, a valve in accordance with the invention, adapted to the same diameter of valve hole, permits a decrease of about 10% in the space taken up by the mounted valve in the transverse direction, with definitely greater tightness. Therefore it is possible to mount this valve 6 on the rim 3 despite the very close position of the disk 2 (see FIGS. 2 and 3).

Finally, the association between these two diametrically opposite direct resting zones 634 and a sealing joint 65 of grommet type, which assures a very strong seal, makes it possible to retain a surface of customary quality for the radially inner surface of the rim around the valve hole, without requiring perfect planarity, as is necessary in the case of toroidal sealing rings having a direct circumferential resting surface.

The invention is not limited to the reverse-mounting valves which have just been described. In the case of valves of customary mounting similar to the one shown in FIG. 1, the presence of two diametrically opposite resting zones makes it possible substantially to decrease the space taken up by the valve base in the direction of the axis of the wheel without the increase in longitudinal size in any way penalizing the mounting of the valve.

Figure 5:
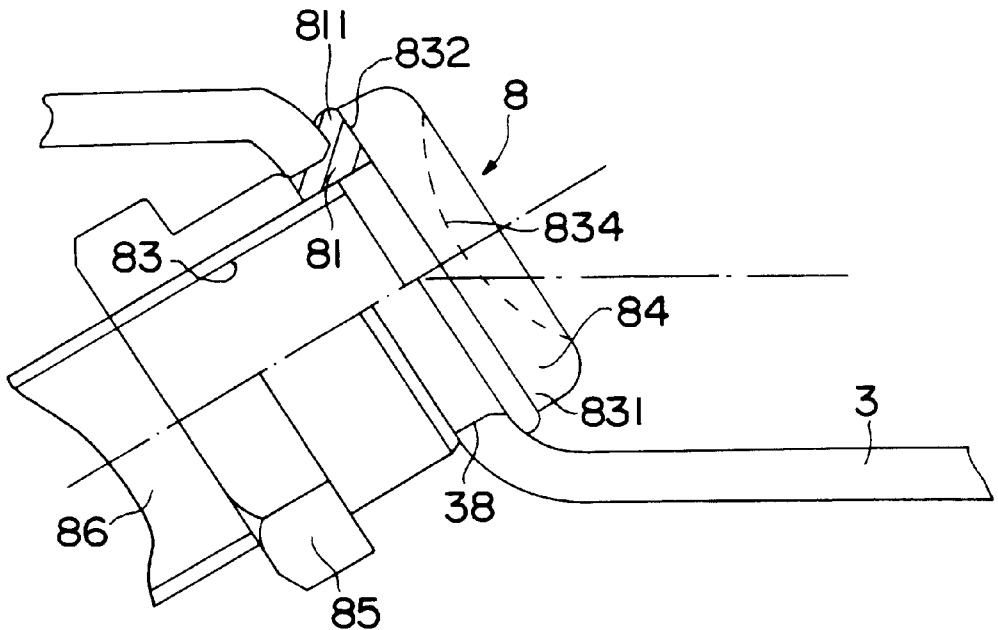
FIG. 5 is an axial section through a valve in accordance with the invention of conventional mounting type.
Figure 6:
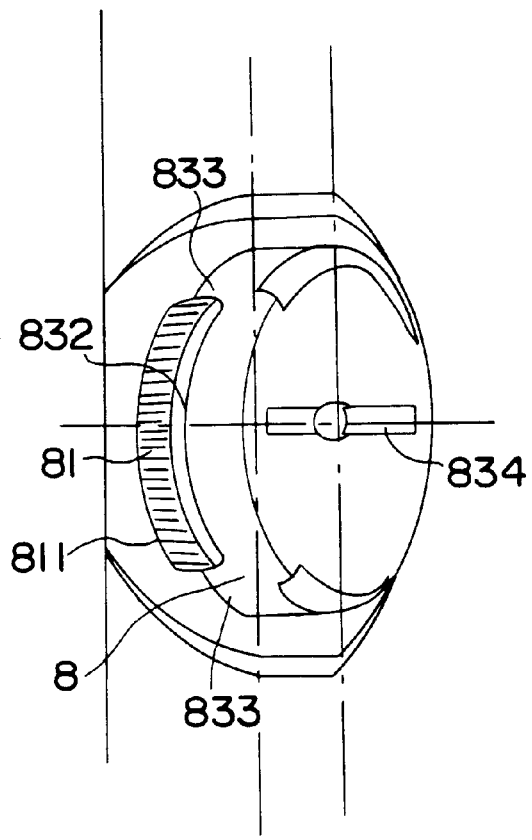
FIG. 6 is a perspective view of the base of a valve in accordance with the invention, similar to that of FIG. 5.

By way of example, FIG. 5 shows a valve 8 in accordance with the invention of conventional mounting type. This valve 8 has a valve base 84 with a tubulure 83 to be introduced into a valve hole 38 on the radially outer surface of the rim 3 and cooperating with a nut 85 screwed-on from the radially inner side of the rim. The shoulder 831 of the tubulure 83, which is of substantially elliptical shape, comprises radially an annular recess 832 intended to assure the tightness with a sealing joint 81 followed by two diametrically opposite resting zones 833 (see FIG. 6). The sealing joint 81 is a grommet joint of generally cylindrical shape having a radially enlarged base 811. In FIG. 6, the valve 8 is in position mounted on a rim and the crushed base of the grommet joint emerging from its recess 832 can be noted.

The tubulure 83 is extended by a straight or bent valve stem 86. Relative to an ordinary valve with toroidal sealing ring 5, such a valve 8, adapted to the same diameter of valve hole, permits a decrease of about 10% in the space taken up by the valve mounted in the axial direction with greater tightness and a quality of the surface of the rim around the valve hole on the resting side which does not require any special tooling operation in order to assure the planarity thereof.

In FIGS. 5 and 6 is also presented a slot 834 used for blocking the tubulure 83 in place when screwing the nut 85.

I claim:

1. A valve intended to be removably attached to a rim for heavy-vehicle tubeless tires, passing through a valve hole, in which the means for a tight fastening to the rim comprise:
    a sealing joint,
    a valve base with a tubulure intended to pass through the valve hole, said tubulure having a shoulder perpendicular to the axis of said tubulure and forming a first resting surface against a first surface of said rim, said shoulder having means for maintaining the sealing joint,
    locking means forming a second resting surface against a second surface of said rim and cooperating with said tubulure in order axially to compress said sealing joint between said shoulder and said first surface of the rim,
    characterized by the fact that said first resting surface is formed of two diametrically opposite resting zones.

2. A valve according to claim 1, in which the valve base is extended by a valve stem which is directed perpendicular to the central diameter connecting the two resting zones.

3. A valve according to claim 1, in which the shoulder of the valve base has a generally elliptical shape.

4. A valve according to claim 1, in which the first surface of the rim is the radially outer surface of said rim and the locking means is a nut intended to be screwed onto the tubulure in order to come against the radially inner surface of the rim.

5. A valve according to claim 1, in which the first surface of the rim is the radially inner surface of said rim, said tubulure has a threaded inner wall and the locking means is a screw intended to cooperate with the thread of said tubulure.

6. A valve according to claim 5, in which the threaded inner wall of said tubulure has a radial height greater than the thickness of the rim.

7. A valve according to claim 1, in which the sealing joint has a substantially cylindrical shape with an enlarged base, said rim externally surrounding the tubulure of the valve base over at least a part of its axial height so as to assure tightness between said tubulure and the wall of the valve hole, and said enlarged base extending radially with an axial height greater than that of a recess of the tubulure of the valve base so as to assure tightness between said shoulder and said first surface of the rim.

8. A rim equipped with a valve according to claim 1.

9. A valve intended to be removably attached to a rim for a heavy-vehicle tubeless tire, passing through a valve hole in the rim, comprising:
    a valve base having a tubulure intended to pass through the valve hole,
    an annular seal intended to be interposed between the valve hole and the tubulure and to engage a surface of the rim surrounding the valve hole,
    said tubulure having a shoulder for compressing the annular seal against the surface of the rim surrounding the valve hole and having two diametrically opposite extensions for engaging the rim surface beyond the outer periphery of the seal to limit the compression of the seal, and
    locking means engageable with the opposite surface of the rim surrounding the valve hole for locking the tubulure on the rim in sealed condition.

* * * * *